Feb. 5, 1924.
S. B. LEITZELL
1,482,853
BRAKE SHOE OR DRUM
Filed Dec. 12, 1921
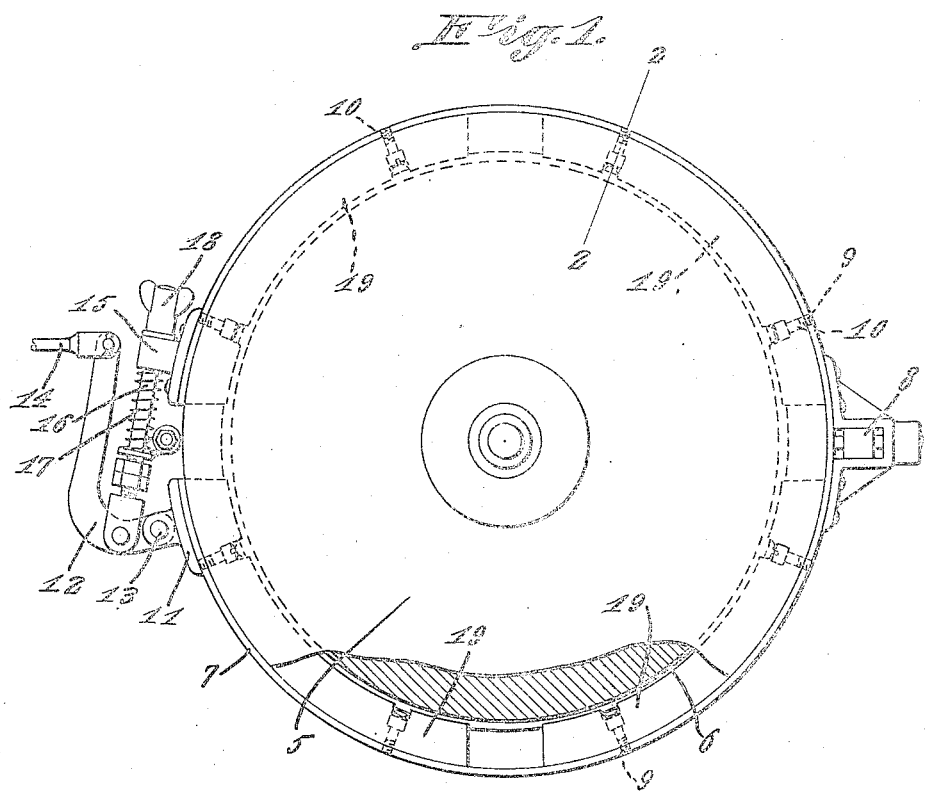

Patented Feb. 5, 1924.

1,482,853

UNITED STATES PATENT OFFICE.

SAMUEL B. LEITZELL, OF BUTLER, PENNSYLVANIA.

BRAKE SHOE OR DRUM.

Application filed December 12, 1921. Serial No. 521,796.

*To all whom it may concern:*

Be it known that I, SAMUEL B. LEITZELL, a citizen of the United States, residing at Butler, in the county of Butler and State of Pennsylvania, have invented a new and useful Brake Shoe or Drum, of which the following is a specification.

This invention relates to brake constructions, the primary object of the invention being to provide a novel form of brake shoe which will insure a positive operation of the elements thereof.

Another object of the invention is to provide a sectional brake shoe, wherein the same may be readily and easily removed and replaced, should the same become worn or otherwise rendered inoperative.

A still further object of the invention is to provide a brake construction possessing the maximum amount of gripping qualities, and one wherein the elements thereof will be exceptionally long lived.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a side elevational view of a brake drum and band, a portion of the drum being broken away to illustrate the band and shoe.

Figure 2 is a sectional view taken on line 2—2 of Figure 1.

Referring to the drawing in detail, the reference character 5 designates the brake drum which is formed of any suitable material, and is provided with a peripheral groove 6 which is preferably V-shaped, as clearly shown by Figure 1 of the drawing.

The movable section of the brake embodies a band 7 which may be connected to a support as by means of the bracket 8, the band being formed with suitable threaded openings indicated at 49 for accommodating the securing screws 10, which are shown as having the threaded portions thereof positioned in the threaded openings.

The band 7 is split, as clearly shown by Figure 1 of the drawing, the ends thereof being spaced apart to permit of movement of the band to accomplish its purpose. A bracket member 11 is secured adjacent to one end of the brake band, which bracket member provides a support for the operating arm 12, which is pivotally connected to the bracket member 11 as at 13. Connected with the upper end of the arm 12 is the usual brake rod 14, which may have connection with a suitable actuating mechanism not shown, for causing the arm 12 to move to operate the brake band.

The opposite end of the band 7 is formed with a bearing member 15, through which the adjusting bolt 16 moves, a coiled spring 17 being mounted on the bolt 16 to normally hold the ends of the band 7 in spaced relation. A winged nut 18 is positioned on one end of the bolt 16, whereby the ends of the band may be adjusted with respect to each other.

Secured to the inner surface of the band 7, are the sections 19 which form the brake shoe, and as shown, these sections are spaced apart to permit the band 7 to flex for moving the shoe or sections thereof into and out of engagement with the drum.

Each of these sections 19 is substantially triangular in cross section to conform to the V-shaped groove in which the same operates, to insure a close engagement between the walls of the shoe and walls of the groove in which the same moves. In order that the securing screws 10, will not contact with the drum of the brake, the openings in the sections of the brake shoe are counter-sunk to receive the heads of the screws as clearly shown by Figure 2 of the drawing.

It might be further stated that these sections 19 of the brake shoe are formed preferably of wood, but it is to be understood that it is within the scope of the invention to construct the shoe or sections thereof of any suitable material, such as compressed fibre or the like.

Having thus described the invention, what is claimed as new is:—

In a brake construction, a drum formed with a peripheral groove, the walls of the groove being inclined, a brake band supported adjacent to the periphery of the drum and having threaded openings, a brake shoe including a plurality of sections, each section being substantially triangular in cross section to fit within the peripheral groove of the drum, said shoe having openings, and securing screws extending through the shoes and having their threaded ends positioned in threaded openings of the brake bands, the heads of the screws moving in the peripheral groove of the drum.

In testimony that I claim the foregoing as my own, I have hereto affixed my signature in the presence of two witnesses.

SAMUEL B. LEITZELL.

Witnesses:
E. P. PEFFER,
GUS ULRICH, Jr.